US010545832B2

(12) United States Patent
Dain et al.

(10) Patent No.: US 10,545,832 B2
(45) Date of Patent: *Jan. 28, 2020

(54) SIMILARITY BASED DEDUPLICATION FOR SECONDARY STORAGE

(71) Applicant: International Business Machines Corporation, Armonk, NY (US)

(72) Inventors: Joseph W. Dain, Vail, AZ (US); Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 395 days.

This patent is subject to a terminal disclaimer.

(21) Appl. No.: 15/057,721

(22) Filed: Mar. 1, 2016

(65) Prior Publication Data

US 2017/0255525 A1 Sep. 7, 2017

(51) Int. Cl.
*G06F 7/00* (2006.01)
*G06F 17/00* (2019.01)
*G06F 11/14* (2006.01)
*G06F 16/22* (2019.01)
*G06F 16/2455* (2019.01)

(52) U.S. Cl.
CPC ...... *G06F 11/1453* (2013.01); *G06F 11/1464* (2013.01); *G06F 16/2255* (2019.01); *G06F 16/24568* (2019.01); *G06F 2201/80* (2013.01)

(58) Field of Classification Search
CPC ........... G06F 17/3033; G06F 17/30516; G06F 11/1453; G06F 11/1464; G06F 2201/80; G06F 16/2255; G06F 16/24568
See application file for complete search history.

(56) References Cited

U.S. PATENT DOCUMENTS

| 8,725,705 B2 * | 5/2014 | Hirsch | G06F 11/1453 707/698 |
| 8,850,583 B1 * | 9/2014 | Nelson | H04L 63/1433 380/44 |
| 8,898,114 B1 * | 11/2014 | Feathergill | G06F 16/1752 707/648 |

(Continued)

OTHER PUBLICATIONS

U.S. Appl. No. 15/084,322 "Office Action Summary", dated Jul. 27, 2018, pp. 1-27.

(Continued)

*Primary Examiner* — Hasanul Mobin
(74) *Attorney, Agent, or Firm* — Kunzler Bean & Adamson

(57) ABSTRACT

For similarity based deduplication of remote data repositories, a parse module generates a rolling hash value based on a portion of an incoming stream of backup data. A comparison module compares the rolling hash value with entries stored in a rolling hash index, and in response to matching the rolling hash value with an entry in the rolling hash index, generates a strong hash value and determines if a match of the strong hash value exists in a first strong hash index. The comparison module, in response to a determination that the match does not exist in the first strong hash index, compares the strong hash value with entries in a second strong hash index in the remote data repository. A migration module, in response to a determination that the strong hash value does not match any hash entries, stores the portion of backup data as new data.

20 Claims, 8 Drawing Sheets

(56) References Cited

U.S. PATENT DOCUMENTS

| | | | |
|---|---|---|---|
| 2007/0250674 A1* | 10/2007 | Fineberg | G06F 11/1451 711/162 |
| 2009/0225676 A1* | 9/2009 | Kisela | H04L 1/24 370/252 |
| 2009/0307251 A1* | 12/2009 | Heller | G06F 16/174 |
| 2009/0307329 A1* | 12/2009 | Olston | G06F 16/184 709/214 |
| 2010/0058013 A1* | 3/2010 | Gelson | G06F 11/1453 711/162 |
| 2011/0307659 A1* | 12/2011 | Hans | G06F 3/0613 711/114 |
| 2014/0279951 A1* | 9/2014 | Akirav | G06F 17/30156 707/692 |
| 2014/0279952 A1* | 9/2014 | Akirav | G06F 16/2365 707/692 |
| 2014/0301394 A1* | 10/2014 | Arad | H04L 45/7453 370/392 |
| 2015/0142755 A1* | 5/2015 | Kishi | G06F 12/04 707/692 |
| 2017/0286233 A1 | 10/2017 | Dain et al. | |

OTHER PUBLICATIONS

U.S. Appl. No. 15/084,322 "Office Action Summary", dated Feb. 14, 2019, pp. 1-15.

List of IBM Patent or Patent Applications Treated as Related Filed on Mar. 29, 2016.

* cited by examiner

SIMILARITY BASED DEDUPLICATION FOR SECONDARY STORAGE

FIELD

The subject matter disclosed herein relates to data storage and more particularly relates to offloading data to secondary storage.

BACKGROUND

Organizations can store data on local data storage systems (on-premises) and may utilize remote data storage systems (off-premises) for backup, disaster recovery, etc. For example, an online retailer may store customer data on a plurality of locally-hosted servers, while storing backup copies of the data on a remote data center in the "cloud." The use of on-premises and off-premises storage systems is known as a "hybrid" storage system or "hybrid cloud."

Many multi-system storage environments implement data deduplication technologies to improve storage capacity utilization by reducing the amount of duplicated storage across storage devices. Data deduplication systems reduce the total amount of physical storage that is required to store data by ensuring that duplicate data is not stored multiple times. However, current multi-system storage environments implement similarity based deduplication systems that assume that all of the repository data is on-premises, and furthermore, these similarity based deduplication systems are not capable of supporting hybrid clouds.

BRIEF SUMMARY

A method for similarity based deduplication of secondary or remote storage is disclosed. An apparatus and computer program product also perform the functions of the method. An apparatus, in one embodiment, includes a parse module that generates a rolling hash value based on a portion of an incoming stream of backup data. The apparatus also includes a comparison module that compares the rolling hash value with entries stored in a rolling hash index, and in response to matching the rolling hash value with at least one entry in the rolling hash index, generates a strong hash value and determines if a match of the strong hash value exists in a first strong hash index of a primary data repository. The comparison module also, in response to a determination that the match does not exist in the first strong hash index, further compares the strong hash value with entries in a second strong hash index in a secondary data repository. In one embodiment, the apparatus includes a migration module that, in response to a determination that the strong hash value does not match an entry in the first strong hash index or the second strong hash index, stores the portion of the incoming stream of backup data as new data in at least one of the primary data repository or the secondary data repository.

In one embodiment, the apparatus includes an import module that imports data from the secondary data repository into the primary data repository. The import module also imports the second strong hash index into the primary data repository, and/or only imports entries that correspond to the portion of the incoming stream of backup data from the second strong hash index. In some embodiments, the import module is further configured to only import entries that are cached in the primary data repository.

In certain embodiments, the migration module is further configured to retrieve from the secondary data repository, in response to the determination that the strong hash value matches an entry in the second strong hash index, data corresponding to the entry in the second strong hash index. Additionally, the comparison module, in response to a determination that the rolling hash value does not match an entry in the rolling hash index of the primary data repository, queries the secondary data repository with the strong hash value to determine if the secondary data repository contains a copy of the portion of the incoming stream of backup data.

A method, in one embodiment, includes the steps of generating a rolling hash value based on a portion of an incoming stream of backup data, and comparing the rolling hash value with entries stored in a rolling hash index. The method also includes generating, in response to matching the rolling hash value with at least one entry in the rolling hash index, a strong hash value and determining if a match of the strong hash value exists in a first strong hash index of a primary data repository. If not, the method includes further comparing the strong hash value with entries in a second strong hash index in a secondary data repository. In one embodiment, the method includes storing, in response to a determination that the strong hash value does not match an entry in the first strong hash index or the second strong hash index, the portion of the incoming stream of backup data as new data in at least one of the primary data repository or the secondary data repository.

A computer program product, in one embodiment, includes a computer readable storage medium having program instructions embodied therewith. The program instructions, in certain embodiments, are readable/executable by a processor to cause the processor to generate, by processor, a rolling hash value based on a portion of an incoming stream of backup data. The program instructions, in some embodiments, are readable/executable by a processor to compare the rolling hash value with entries stored in a rolling hash index, and in response to matching the rolling hash value with at least one entry in the rolling hash index, generate a strong hash value and compare the strong hash value with entries in a first strong hash index of a primary data repository. In response to a determination that the match does not exist in the first strong hash index, the instructions are readable/executable by a processor to further compare the strong hash value with entries in a second strong hash index in a secondary data repository.

In a further embodiment, the program instructions are readable/executable by a processor to cause the processor to store, in response to a determination that the strong hash value does not match an entry in the first strong hash index or the second strong hash index, the portion of the incoming stream of backup data as new data in the primary data repository.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
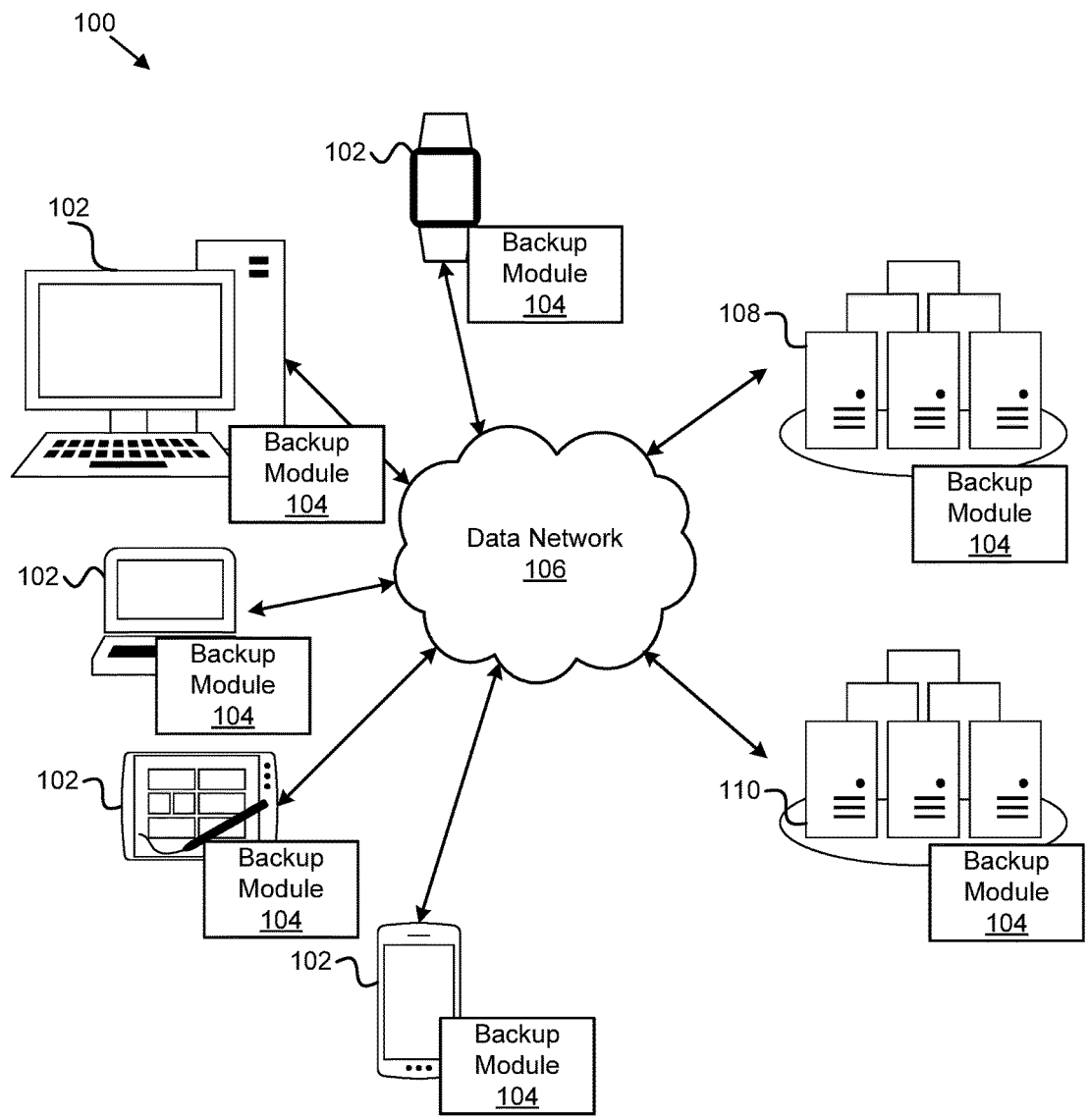
FIG. 1 depicts one embodiment of a system for data deduplication in multi-storage system environments in accordance with embodiments of the present disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures Like numbers refer to like elements in all figures, including alternate embodiments of like elements.

FIG. 1 depicts one embodiment of a system 100 for similarity-based data deduplication in multi-storage system environments in accordance with embodiments of the present disclosure. In one embodiment, the system 100 includes one or more information handling devices 102, one or more backup modules 104, one or more data networks 106, one or more local data repositories 108, and/or one or more remote data repositories 110. In certain embodiments, even though a specific number of information handling devices 102, backup modules 104, data networks 106, local data repositories 108, and remote data repositories 110 are depicted in FIG. 1, one of skill in the art will recognize, in light of this disclosure, that any number of information handling devices 102, backup modules 104, data networks 106, local data repositories 108, and remote data repositories 110 may be included in the system 100 for offloading data to secondary storage.

In one embodiment, the system 100 includes one or more information handling devices 102. The information handing devices 102 may include one or more of a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to a local data repository 108 and/or a remote/secondary data repository 110 via a data network 106, described below. The information handling devices 102, in a further embodiment, are capable of executing various programs, program code, applications, instructions, functions, or the like, which may access, store, download, upload, and/or the like data located on the local data repository 108 and/or the remote data repository 110.

In one embodiment, a backup module 104 is configured to backup new data. The backup module 104, as described above, may reside in any of various information handling devices 102 that communicate directly with a storage entity. As used herein, an entity may be a logical storage device, a virtual storage device (e.g., a virtual cartridge, a virtual file, or the like), an application, and/or the like. Alternatively, an information handling device 102 may communicate with the backup module 104 of either the local data repository 108 or the backup module 104 of the remote or secondary data repository 110. In a further embodiment, the backup module 104 of the local data repository 108 may act as a deduplication gateway to the remote data repository 110. Stated differently, in this embodiment, all backup requests from the information handling devices 102 are directed to the backup module 104 of the local data repository 108 which manages the mirroring/replication of data across multiple data repositories that may be either local and/or remote (i.e., on-premises or off-premises).

Figure 2:
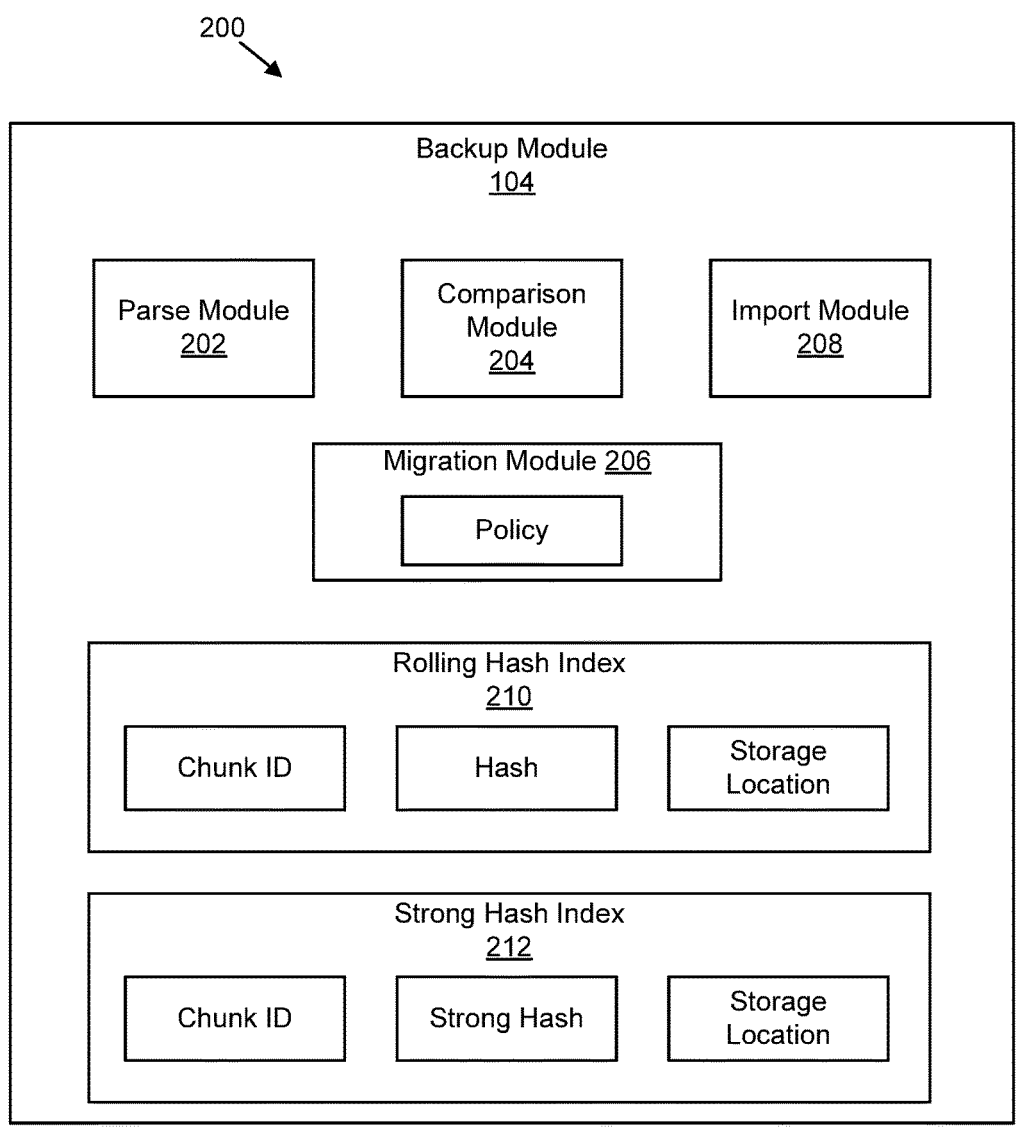
FIG. 2 is a schematic block diagram illustrating one embodiment of the backup module in accordance with embodiments of the present disclosure.

The backup module 104, as will be described in greater detail below with reference to FIG. 2, is configured to analyze received backup data and compare the data to a memory resident index and determine if similar data is stored in the local data repository 108 or if the similar data is in another location, such as an object storage instance or entity. A strong hash may also be calculated as part of the received data analysis. If the similar data is in the local data repository 108, a hash of the data is retrieved from the local data repository and compared against the strong hash. The new backup data may then be compressed and stored in the local data repository 108 if the strong hash comparison fails.

In another embodiment, the backup module 104 is configured to determine that the similar data is not in the local data repository 108, but is instead in the object storage. In this embodiment, the backup module 104 is configured to retrieve the strong hash that corresponds with the similar data and compare the strong hash of the new backup data with the strong hash of the similar data in object storage. If the strong hashes do not match, the new backup data may be compressed and stored in the local data repository 108 and/or the object storage.

In another embodiment, the backup module 104 is configured to determine that the similar data resides in the remote data repository 110. To minimize data transfer across the data network 106, the backup module 104 may be configured to compress and store all backup data as new data when a match of similar data indicates that the data corresponding to the similar data resides in the remote data repository 110. These and other features and benefits of the backup module 104 will be discussed in greater detail below with reference to FIG. 2.

In various embodiments, the backup module 104 may be embodied as a hardware appliance that can be installed or deployed in a local data repository 108, a remote data repository 110, on an information handling device 102, or elsewhere on the data network 106. In certain embodiments, the backup module 104 may comprise a hardware device such as a secure hardware dongle or other hardware appliance device (e.g., a set-top box, a network appliance, or the like) that attaches to the device of the local data repository 108, the remote data repository 110, another information handling device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like), and/or the like. A hardware appliance of the backup module 104 may comprise a power interface, a wired and/or wireless network interface, a graphical interface that attaches to a display, and/or a semiconductor integrated circuit device as described below, configured to perform the functions described herein with regard to the backup module 104.

The backup module 104, in such an embodiment, may be provided as software that is not tightly coupled to any hardware. The backup module 104 may also comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, the backup module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the backup module 104.

The semiconductor integrated circuit device or other hardware appliance of the backup module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of the security module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The local data repository 108, in one embodiment, may comprise one or more servers, or other data storage devices, that include volatile and non-volatile storage media for storing data. The data may include documents, images, videos, audio files, metadata, or the like. The data may be stored in a file system, as objects, as blocks, and/or the like. The local data repository 108 may be located in a data center either on the premises of an organization and/or in the cloud such that data is accessed via a data network 106 like the Internet. The local data repository 108, in one embodiment, stores backup data for one or more entities, applications, programs, and/or the like for storage and access of data used by the one or more entities, applications, programs, and/or the like. The data stored on the local data repository 108 may be stored in a compressed format, e.g., the data may be compressed using various data compression methods such as data deduplication.

Similarly, the remote data repository 110 may comprise one or more servers, or other storage devices, that include volatile and non-volatile storage media for storing data. The data may include documents, images, videos, audio files, metadata, or the like. The data may be stored in a file system, as objects, as blocks, and/or the like. The remote data repository 110 may store data received from the local data repository 108, e.g., the data may be "pushed," automatically or manually, from the local data repository 108 to the remote data repository 110. The remote data repository 110 may be located in a data center either on the premises of an organization and/or in the cloud such that data is accessed via a data network 106 like the Internet. The remote data repository 110, in one embodiment, is configured as a backup storage system, a disaster recovery system, a data restore system, and/or the like.

Together, the local data repository 108 and the remote data repository 110 may comprise a hybrid cloud storage system. For example, the local data repository 108 may be a private cloud storage system located on the premises of a company, and the remote data repository 110 may be a public cloud storage system (e.g., Amazon S3®, Rackspace®, Softlayer® object storage, etc.). Workloads may be split between the devices of the private and public clouds, a data repository 108, 110 may be split between the public and private clouds, workloads and/or data may be manually or automatically shifted between the public and private clouds, and/or the like. As described below, migrating data between the local data repository 108 and the remote data repository 110 is done transparent to an application that is using the data such that the application is unaware that data is being moved between the data repositories 108, 110. In one embodiment, the local data repository 108 and the remote data repository 110 are part of a deduplication gateway system, such as ProtecTIER® from IBM® of Armonk, N.Y.

FIG. 2 is a schematic block diagram illustrating one embodiment of the backup module 104 in accordance with embodiments of the present disclosure. As discussed above, the backup module 104 is configured to analyze new incoming backup data and identify which portions of the new backup data might already be stored in either the local data repository 108, or the remote data repository 110, and reduce data duplication by avoiding redundant storage of such portions of data. The backup module 104, in one embodiment, includes one or more of a parse module 202, a comparison module 204, a migration module 206, an import module 208, a rolling hash index 210, and a strong hash index 212, each which are described in more detail below.

The parse module 202, in one embodiment, analyzes an incoming stream of backup data and divides the stream into a series of chunks. In certain embodiments, the boundaries of an individual chunk may overlap an adjacent chunk. The parse module 202 is configured to determine whether any of the series of chunks are already stored in the local data repository 108. The data stream may be analyzed with a rolling-window fingerprinting (i.e., rolling hash) technique. An example of a rolling-window fingerprinting technique suitable for use with the parse module 202 includes, but is not limited to, Karp-Rabin fingerprinting.

In one embodiment, the rolling hash, as calculated by the parse module 202, is a simplified hash, as opposed to a so-called "strong hash" (e.g., Message-Digest Algorithm 5 "MD5", or Secure Hash Algorithm 1 "SHA-1"). The simplified hash, beneficially, is quickly calculable and comparable to entries in the rolling hash index 210. However, the possibility exists that two different strings of characters or chunks in the incoming stream of backup data result in the same rolling hash value (i.e., a hash collision). Accordingly, the backup module 104 is also configured to maintain the strong hash index 212, as will be described in greater detail below.

The parse module 202 is further configured to communicate the rolling hash with the comparison module 204. In an alternative embodiment, the features and benefits of the parse module 202 and the comparison module 204 may be integrated into a single module.

In one embodiment, the comparison module 204 is configured to compare the rolling hash received from the parse module 202 with entries stored in the rolling hash index 210. The rolling hash index 210 may reside in resident memory to enable fast comparison searches. In one embodiment, the rolling hash index 210 stores an identifier (e.g., chunk ID number) for a portion of data, a hash corresponding to the identifier, and in some embodiments, a storage location of the portion of data. The comparison module 204 is also configured to update the rolling hash index 210 with new rolling hashes that are not matched. These new rolling hashes represent data that has not been previously stored into either the local data repository 108 or the remote data repository 110.

In another embodiment, the comparison module 204 is configured to calculate a strong hash of the portion of data. Although the calculation of a strong hash (i.e., MD5 or SHA-1) requires more processing time, the occurrence of hash collisions is nearly eliminated. The comparison module 204 is further configured to compare the newly generated strong hash with entries in the strong hash index 212. The strong hash index 212, like the rolling hash index 210, may store a strong hash value for each chunk or portion of data stored in the local data repository 108 together with a storage location that indicates where the data corresponding to the strong hash is stored. That storage location may include the local data repository 108, or the remote data repository 110.

The migration module 206, in one embodiment, migrates a data segment to one or more of the local data repository 108 and the remote data repository 110, in accordance with a data backup policy. The data backup policy may dictate that each chunk of data is stored in only one storage device (i.e., entity), or alternatively, the data backup policy may dictate that each chunk of data is mirrored or replicated across two or more storage devices. In a further embodiment, the backup policy may dictate the type of entity that stores the chunk of data. As described above, the data segments stored on the local data repository 108 may be associated with one or more entities, such as virtual or physical cartridges, virtual or physical drives, virtual objects, etc. The backup policy may require that each chunk of data is stored on, for example, at least one physical tape drive and one physical hard disk drive.

In one embodiment, the migration module 206 migrates a data segment in a compressed format. For example, once a decision is made by the backup module 104 to store a chunk of data in either the local or remote data repositories 108, 110 (because it is not already stored, i.e., it is new), the migration module 206 is configured to compress the data and then transmit the data. In an alternative embodiment, the chunk of data is transmitted in an uncompressed format. If data segments or chunks are stored in the local data repository 108 using a data deduplication compression method, the migration module 206 may migrate the data segments from the local data repository 108 in its deduplicated format. In such an embodiment, the migration module 206 also migrates compression metadata along with the data segment. In this manner, the data segment does not have to be uncompressed or "rehydrated" prior to migrating the data segment, and then re-compressed before the data segment is stored on the remote data repository 110. This also reduces the bandwidth used to transmit the data segment from the local data repository 108 to the remote data repository 110.

In some embodiments, the migration module 206 migrates data segments directly from the local data repository 108 to the remote data repository 110 over the data network 106. In certain embodiments, the migration module 206, copies a data segment to a file prior to migrating the data segment to the remote data repository 110. In such an embodiment, the migration module 206 does not migrate the data directly to the remote data repository 110, but instead copies the data to a file, which is subsequently transferred to the remote data repository 110.

In some embodiments, the migration module 206 utilizes various application programming interfaces ("APIs") to migrate data segments, files, objects, of the like, between the local data repository 108 and the remote data repository 110. For example, the migration module 206 may use representational state transfer ("REST") APIs to PUT or GET data segments. Other APIs may be provided by the provider of the remote data repository 110, such as Amazon® or Rackspace®.

After the migration module 206 migrates data segments to the remote data repository 108, the one or more entities that are associated with the data may have data stored on both the local data repository 108 and the remote data repository 110. However, the distinction is transparent to an application using the data and/or an entity that refers to the data such that the application or entity is not aware of where the data is stored.

The import module 208, in one embodiment, is configured to import a rolling hash index 210 and/or a strong hash index 212 from a remote data repository 110. In an alternative embodiment, the import module 208 is configured to import the rolling hash index 210 and/or the strong hash index 212 from multiple local or remote data repositories 108, 110. The backup module 104, of a "gateway" or "primary" backup device (see FIG. 3), therefore, is able to filter out duplicate data between multiple data repositories that may be sharing the same object storage (i.e., global deduplication) because a comparison of incoming backup data is now performed against rolling hashes and/or strong hashes of multiple local and remote data repositories 108, 110.

In certain embodiments, the functions performed by the backup module 104 can be performed simultaneously or in parallel with other processes, such as a defragmentation process to increase the usable storage space available on the local data repository 108, a data replication process, a data delete process, a data restore process, a data backup process, and/or the like. The functions performed by the backup module 104 and the defragmentation process may be performed in the background such that an application and/or entity is unaware that data is being migrated or transmitted between the local data repository 108 and the remote data repository 110.

Figure 3:
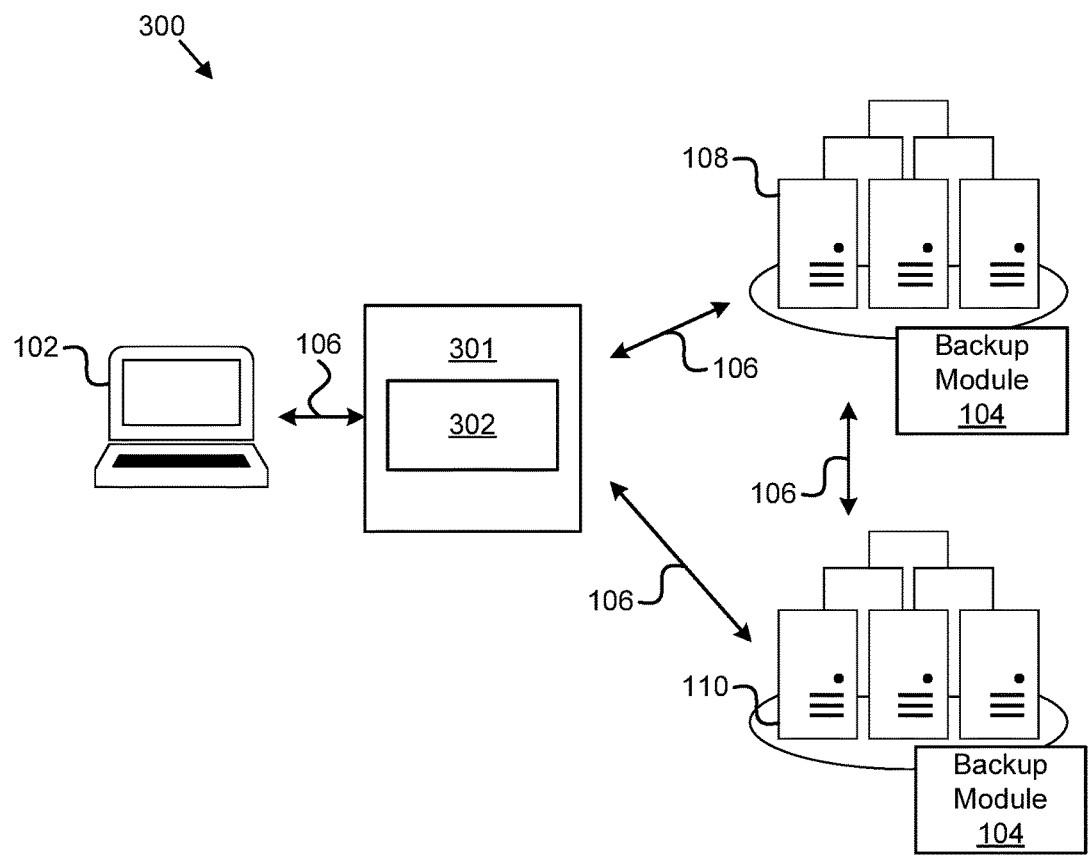
FIG. 3 is a schematic block diagram illustrating another embodiment of a system for data deduplication in multi-storage system environments in accordance with embodiments of the present disclosure.

FIG. 3 is a schematic block diagram illustrating another embodiment of a system 300 for data deduplication in multi-storage system environments in accordance with embodiments of the present disclosure. The depicted system 300 illustrates, for the sake of clarity, a single information handling device 102 communicating with a backup server 301. The local data repository 108 may be embodied as a private cloud and the remote data repository 110 may be embodied as a public cloud, and the repositories 108, 110 may be connected to each other over a data network 106. Each of the data repositories 108, 110 may be embodied as deduplication data repositories such that the data stored in the repositories 108, 110 is stored in a compressed format using data deduplication such that meta data pointers associated with each chunk of data point to a single instance of a data segment (if so required by the policy), and not to multiple copies of the same data segment.

In one embodiment, and as described above, a backup module 302 may function as a gateway to a hybrid cloud storage system where object storage is spread across multiple storage devices located in either the local data repository 108 or the remote data repository 110. The gateway backup module 302, in one embodiment, is operational as part of a standalone hardware device, such as the server 301, for data backup/migration. The gateway backup module 302, in one embodiment, may be configured for global deduplication. As used herein, the phrase "global deduplication" refers to the process of managing duplicate chunks (i.e., portions of data, files, objects, etc.) of data across all devices of the object store, which may be spread across both local and remote data repositories 108, 110.

In one embodiment, the import module (not shown here for clarity) of the gateway backup module 302 is configured to import a rolling hash index and a strong hash index from each backup module 104 in the system 300. In another embodiment, the backup module 302 is configured to only import the strong hash index from each backup module. In one embodiment, the only rolling hash index in the system 300 resides in the gateway backup module 302. Accordingly, the gateway backup module 302 may identify when a portion of an incoming stream of data is already present within any of the local or remote data repositories 108, 110. In an alternative embodiment, the gateway backup module 302 may be configured to constantly query the backup modules 104 of the data repositories 108, 110 to determine if a hash match exists. In this example, the gateway backup module 302 may be configured, upon the arrival of a new backup data stream, to first query with a rolling hash value of a chunk of data, and if the result is positive, query with the strong hash value. Alternatively, the gateway backup module 302 may only query the backup modules 104 with the strong hash value, bypassing the query with the rolling hash value.

In another embodiment, the gateway backup module 302 may be configured to not query the backup modules 104 when new backup data is received, and instead store the new backup data as new data. Subsequently, a global deduplication operation may be performed to identify and remove duplicate chunks of data that do not conform to the data storage policy described above. This may be achieved by, for example, comparing entries in the strong hash index of a first backup module 104 with the entries of a strong hash index in a second backup module 104, and so on with other backup modules 104. Entries that are duplicative may be marked for deletion according to the storage policy. For example, if the storage policy dictates that two copies of each chunk are to be stored, with the first copy being stored in the local data repository 108 and the second copy being stored in the remote data repository 110, and a global deduplication process finds 3 or more copies, the backup module 302 is configured to mark for deletion the extra copies of the chunk that do not conform to the storage policy.

In one embodiment, the backup module 104 is located on the local data repository 410, the remote data repository 416, or a different server in the system 400, and/or may be a network or hardware appliance connected to the system 400, or the backup module may be provided as software only such that it is not tightly coupled to specific hardware. The local data repository 410 may be embodied as a private cloud and the remote data repository 416 may be embodied as a public cloud, and the repositories 410, 416 may be connected to each other over a data network 106. Each of the data repositories 410, 416 may be embodied as deduplication data repositories such that the data stored in the repositories 410, 416 is stored in a compressed format using data deduplication such that each virtual cartridge 402, 404 points to a single instance of a data segment 412, and not to multiple copies of the same data segment 412.

Figure 4:
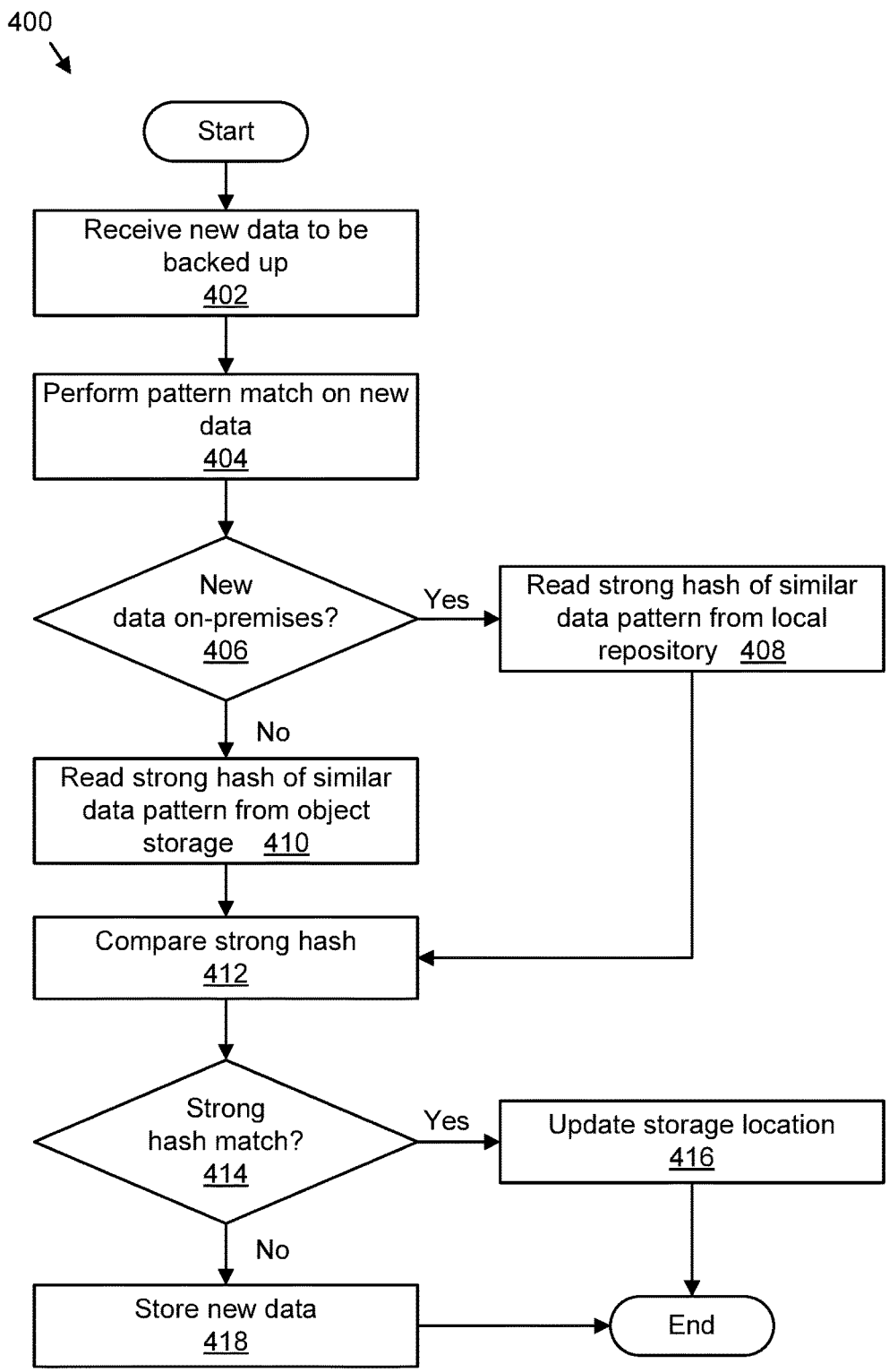
FIG. 4 is a schematic flow chart diagram illustrating one embodiment of a method for similarity based deduplication of local storage and secondary, or remote, storage in accordance with embodiments of the present disclosure.

FIG. 4 is a schematic flow chart diagram illustrating one embodiment of a method 400 for similarity based deduplication of local storage and secondary, or remote, storage in accordance with embodiments of the present disclosure. The method 400 starts and the backup module receives 402 new data to be backup up. In this embodiment, the backup module receives 402 new data from one or more information handling devices. The parse module then performs 404 a similarity pattern match on the new data stream. In one embodiment, the parse module performs a rolling hash fingerprinting operation on the incoming data stream to identify distinguishing points in the data stream, and generate a simple hash of the distinguishing points. As described previously, one example of a rolling hash technique suitable for use with the embodiments of the disclosure includes, but is not limited to, Karp-Rabin fingerprinting.

The comparison module then determines 406 if a copy of the chunks of the backup data stream already reside on-premises. This is achieved by comparing the rolling hash with entries in the rolling hash index. If the data is on-premises, then the comparison module generates a strong hash of the new data chunk that is identified as similar, and reads 408 a strong hash from the strong hash index of the similar data chunk already stored on-premises. In one embodiment, the comparison module retrieves the strong hash from the strong hash index by utilizing the chunk ID of the similar chunk from the rolling hash index. Alternatively, if the new data chunk is not on-premises, then the import module may read 410 the strong hash index of the object storage (i.e., the remote data repository). For example, the import module may query and read the strong hash entry of another backup module in the system.

The comparison module then compares 412 the strong hash of the new data chunk with the strong hash of the similar data chunk and determines 414 if the strong hashes match. If yes, this is indicative of the new data chunk being duplicative of a chunk that is already stored. The migration module updates 416 the storage location of the chunk by updating, for example, a metadata pointer that identifies where the chunk is located so that an information handling device that later requests the new data chunk is able to retrieve the new data chunk. If the comparison module determines 414 that the strong hashes do not match, this is indicative of a new data chunk that is not duplicative, and the migration module stores 418 the new data by migrating the new data chunk to one or more local or remote data repositories. The method 400 then ends.

Figure 5:
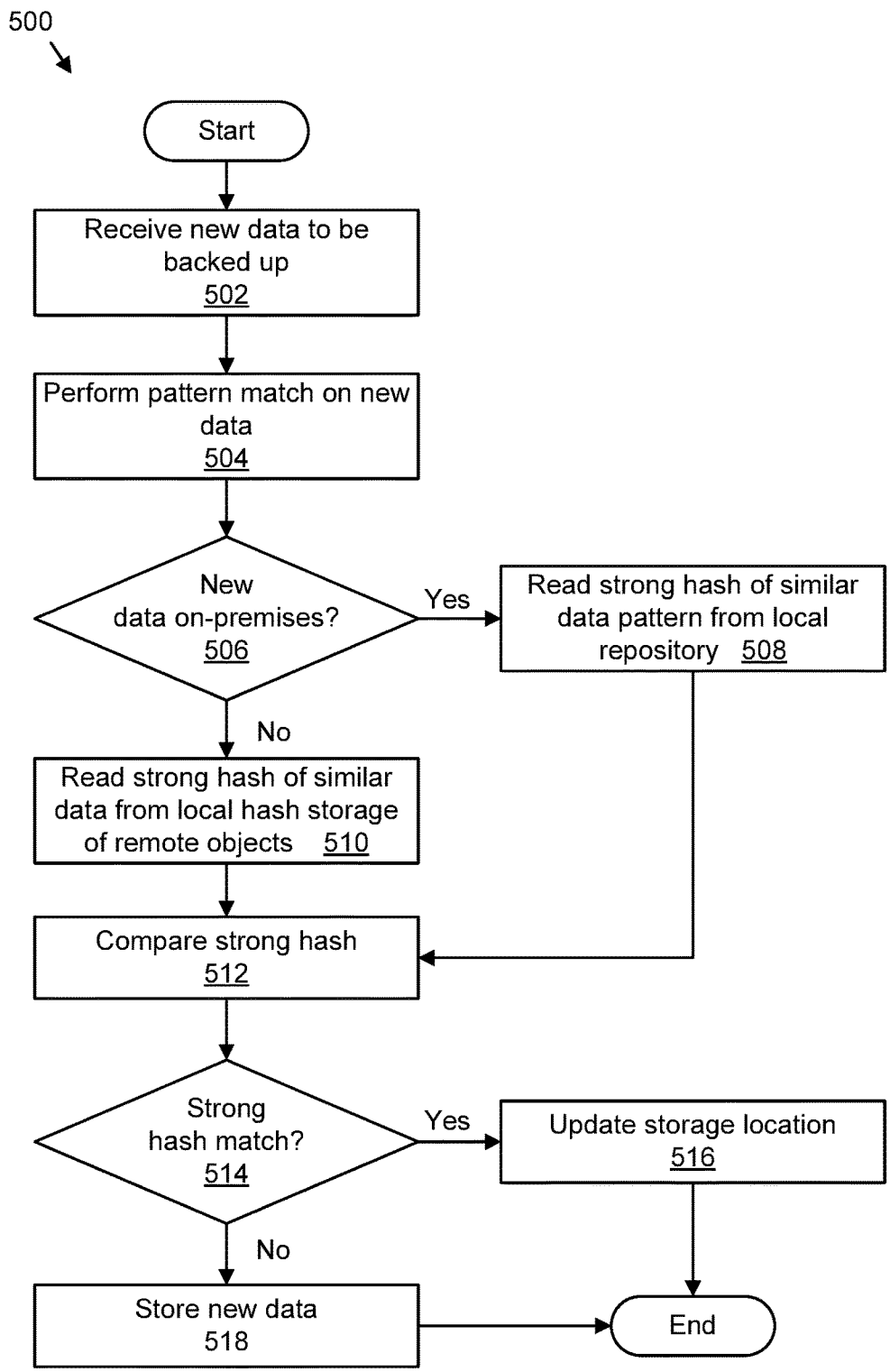
FIG. 5 is a schematic flow chart diagram illustrating one embodiment of a method for similarity based deduplication of local storage and secondary, or remote, storage in accordance with embodiments of the present disclosure.

FIG. 5 is a schematic flow chart diagram illustrating one embodiment of a method 500 for similarity based deduplication of local storage and secondary, or remote, storage in accordance with embodiments of the present disclosure. As will be described below, method 500 differs from the above described method 400 of FIG. 4 in that the backup module may maintain a local strong hash index of data chunks that are stored in a remote data repository.

The method 500 starts and the backup module receives 502 new data to be backup up. In this embodiment, the backup module receives 502 new data from one or more information handling devices. The parse module then performs 504 a similarity pattern match on the new data stream. In one embodiment, the parse module performs a rolling hash fingerprinting operation on the incoming data stream to identify distinguishing points in the data stream, and generate a simple hash of the distinguishing points.

The comparison module then determines 506 if a copy of the chunks of the backup data stream already reside on-premises. This is achieved by comparing the rolling hash with entries in the rolling hash index. If the data is on-premises, then the comparison module generates a strong hash of the new data chunk that is identified as similar, and reads 508 a strong hash from the strong hash index of the similar data chunk already stored on-premises. In one embodiment, the comparison module retrieves the strong hash from the strong hash index by utilizing the chunk ID of the similar chunk from the rolling hash index. Alternatively, if the new data chunk is not on-premises, then the import module may read 510 the strong hash index of the object storage. For example, the backup module may maintain a "master" strong hash index that includes strong hash entries from all data repositories in the system.

The comparison module then compares 512 the strong hash of the new data chunk with the strong hash of the similar data chunk and determines 514 if the strong hashes match. If yes, this is indicative of the new data chunk being duplicative of a chunk that is already stored. The migration module updates 516 the storage location of the chunk by updating, for example, a metadata pointer that identifies where the chunk is located. If the comparison module determines 514 that the strong hashes do not match, this is indicative of a new data chunk that is not duplicative, and the migration module stores 518 the new data by migrating the new data chunk to one or more local or remote data repositories. The method 500 then ends.

Figure 6:
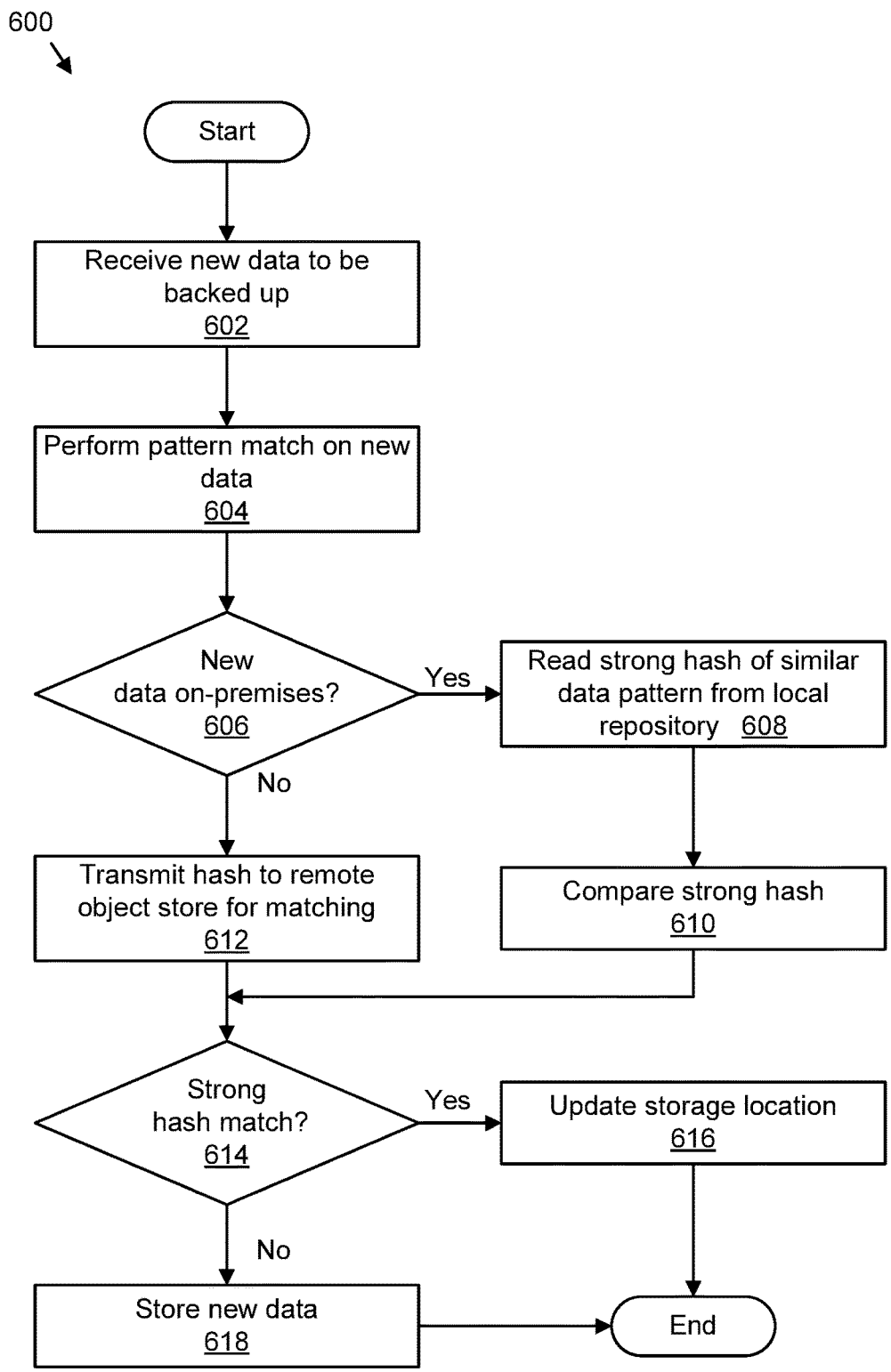
FIG. 6 is a schematic flow chart diagram illustrating one embodiment of a method for similarity based deduplication of local storage and secondary, or remote, storage in accordance with embodiments of the present disclosure.

FIG. 6 is a schematic flow chart diagram illustrating one embodiment of a method 600 for similarity based deduplication of local storage and secondary, or remote, storage in accordance with embodiments of the present disclosure. As will be described below, the method 600 differs from the above described methods of FIG. 4 or 5 in that the backup module may be configured to query a remote data repository for hash matches.

The method 600 starts and the backup module receives 602 new data to be backup up. In this embodiment, the backup module receives 602 new data from one or more information handling devices. The parse module then performs 604 a similarity pattern match on the new data stream. In one embodiment, the parse module performs a rolling hash fingerprinting operation on the incoming data stream to identify distinguishing points in the data stream, and generate a simple hash of the distinguishing points.

The comparison module then determines 606 if a copy of the chunks of the backup data stream already reside on-premises. This is achieved by comparing the rolling hash with entries in the rolling hash index. If the data is on-premises, then the comparison module generates a strong hash of the new data chunk that is identified as similar, and reads 608 a strong hash from the strong hash index of the similar data chunk already stored on-premises. In one embodiment, the comparison module retrieves the strong hash from the strong hash index by utilizing the chunk ID of the similar chunk from the rolling hash index and compares 610 the strong hash of the new data chunk with the strong hash of the similar data chunk and determines 614 if the strong hashes match.

If the comparison module determines 606 that the data is not already on-premises, then the backup module transmits 612 the rolling hash and/or the strong hash to one or more remote repositories to determine if the one or more remote repositories has a copy of the corresponding chunk of data. Once a response is received, the comparison module determines 614 if the strong hashes of the new data and the existing data match.

If there is a match of strong hashes, this is indicative of the new data chunk being duplicative of a chunk that is already stored. The migration module updates 616 the storage location of the chunk by updating, for example, a metadata pointer that identifies where the chunk is located. If the comparison module determines 614 that the strong hashes do not match, this is indicative of a new data chunk that is not duplicative, and the migration module stores 618 the new data by migrating the new data chunk to one or more local or remote data repositories. The method 600 then ends.

Figure 7:
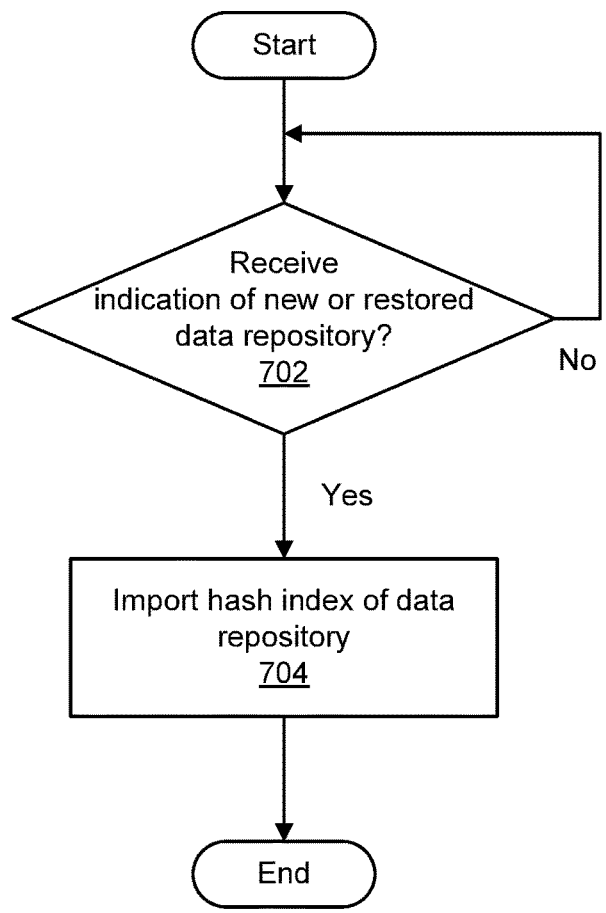
FIG. 7 is a schematic flowchart diagram illustrating one embodiment of a method for importing a hash index of a data repository in accordance with embodiments of the present disclosure.

FIG. 7 is a schematic flowchart diagram illustrating one embodiment of a method 700 for importing a hash index of a data repository in accordance with embodiments of the present disclosure. In one embodiment, the backup module is configured to monitor the backup system (see 100 of FIG. 1 or 300 of FIG. 3) for a data repository that comes online. For example, the backup module may be configured to identify a new data repository that is added to the backup system, such as a new cloud storage system. In another embodiment, the backup module is configured to identify when connectivity is re-established to a data repository that was already part of the backup system.

If the backup module determines 702 that connectivity has been established with the new or already existing data repository, then the import module imports 704 the rolling hash index and/or the strong hash index. In one embodiment, the import module may merge the remote rolling hash index and/or strong hash index with the local rolling hash index and/or local strong hash index. In an alternative embodiment, the backup module maintains separate local and remote rolling hash and/or strong hash indices. The method 700 then ends.

Figure 8:
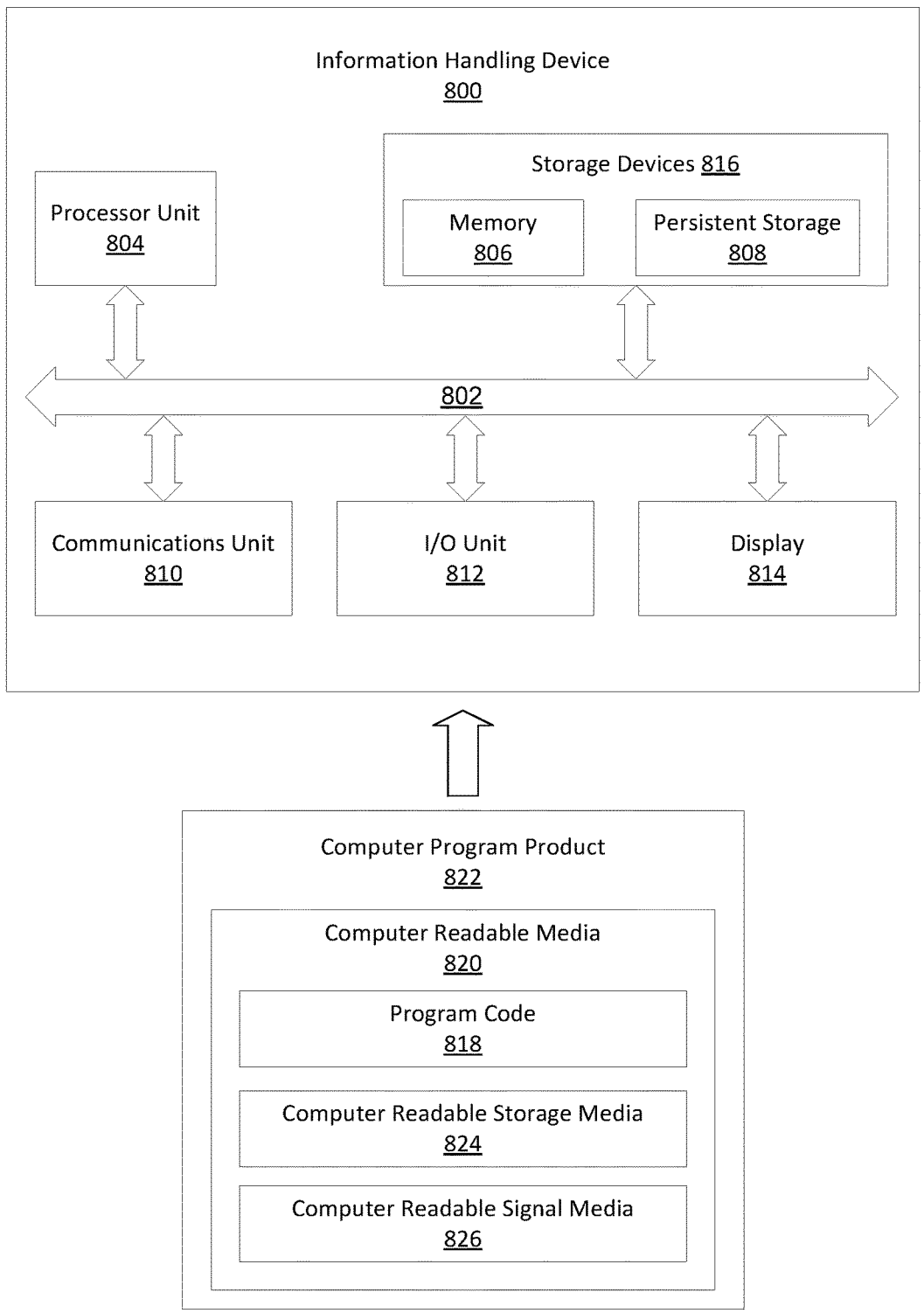
FIG. 8 is a schematic block diagram illustrating one embodiment of an information handling device in accordance with embodiments of the present disclosure.

FIG. 8 is a schematic block diagram illustrating one embodiment of an information handling device 800 in accordance with embodiments of the present disclosure. The information handling system 800 is an example of a computer, which may be used to implement one or more components (e.g., the backup module 104) of embodiments of the invention, and in which computer usable program code or instructions implementing the processes may be located for the illustrative embodiments. In this illustrative example, the information handling system includes communications fabric 802, which provides communications between a processor unit 804, memory 806, persistent storage 808, communications unit 810, input/output (I/O) unit 812, and display 814.

The processor unit 804 serves to execute instructions for software that may be loaded into memory 806. The processor unit 804 may be a set of one or more processors or may be a multi-processor core, depending on the particular implementation. Further, the processor unit 804 may be implemented using one or more heterogeneous processor systems, in which a main processor is present with secondary processors on a single chip. As another illustrative example, the processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Memory 806, in these examples, may be, for example, a random access memory, or any other suitable volatile or non-volatile storage device. Persistent storage 808 may take various forms, depending on the particular implementation. For example, persistent storage 808 may contain one or more components or devices. For example, persistent storage 808 may be a hard drive, a flash memory, a rewritable optical disk, a rewritable magnetic tape, or some combination of the above. The media used by persistent storage 808 may be removable. For example, a removable hard drive may be used for persistent storage 808.

The communications unit 810, in these examples, provides for communication with other data processing systems or devices. In these examples, the communications unit 810 is a network interface card. The communications unit 810 may provide communications through the use of either or both physical and wireless communications links.

The input/output unit 812 allows for the input and output of data with other devices that may be connected to data processing system 800. For example, the input/output unit 812 may provide a connection for user input through a keyboard, a mouse, and/or some other suitable input device. Further, the input/output unit 812 may send output to a printer. The display 814 provides a mechanism to display information to a user.

Instructions for the operating system, applications, and/or programs may be located in the storage devices 816, which are in communication with the processor unit 804 through the communications fabric 802. In these illustrative examples, the instructions are in a functional form on persistent storage 808. These instructions may be loaded into memory 806 for execution by the processor unit 804. The processes of the different embodiments may be performed by the processor unit 804 using computer implemented instructions, which may be located in a memory, such as the memory 806.

These instructions are referred to as program code, computer usable program code, or computer readable program code that may be read and executed by a processor in the processor unit 804. The program code, in the different embodiments, may be embodied on different physical or computer readable storage media, such as the memory 806 or the persistent storage 808.

Program code 818 is located in a functional form on computer readable media 820 that is selectively removable and may be loaded onto or transferred to the information handling device 800 for execution by the processor unit 804. The program code 818 and computer readable media 820 form computer program product 822. In one example, the computer readable media 820 may be a computer readable storage media 824 or a computer readable signal media 826. The computer readable storage media 824 may include, for example, an optical or magnetic disc that is inserted or placed into a drive or other device that is part of the persistent storage 808 for transfer onto a storage device, such as a hard drive, that is part of the persistent storage 808. The computer readable storage media 824 also may take the form of a persistent storage, such as a hard drive, a thumb drive, or a flash memory that is connected to information handling device 800. In some instances, the computer readable storage media 824 may not be removable from the information handling device 800.

Alternatively, the program code 818 may be transferred to the information handling device 800 using computer readable signal media 826. Computer readable signal media 826 may be, for example, a propagated data signal containing program code 818. For example, the computer readable signal media 826 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, the program code 818 may be downloaded over a network to the persistent storage 808 from another device or data processing system through the computer readable signal media 826 for use within the information handling device 800. For instance, program code stored in a computer readable storage media in a server data processing system may be downloaded over a network from the server to the information handling device 800. The system providing the program code 818 may be a server computer, a client computer, or some other device capable of storing and transmitting program code 818.

The different components illustrated for the information handling device 800 are not meant to provide physical or architectural limitations to the manner in which different embodiments may be implemented. The different illustrative embodiments may be implemented in an information handling device including components in addition to and/or in place of those illustrated for the information handling device 800. Other components shown in FIG. 8 can be varied from the illustrative examples shown. The different embodiments may be implemented using any hardware device or system capable of executing program code. For example, a storage device in the information handling device 800 is any hardware apparatus that may store data. The memory 806, persistent storage 808, and the computer readable media 820 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, the memory 806 or a cache such as found in an interface and memory controller hub that may be present in the communications fabric 802.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
one or more processors; and
one or more non-transitory computer readable storage media, the one or more non-transitory computer readable storage media comprising executable code, that when executed by the one or more processors, causes the one or more processors to:
generate a first hash value using a first hashing algorithm, that is a simplified rolling hash value, based on a portion of an incoming stream of backup data over a network;
compare the simplified rolling hash value with entries stored in a rolling hash index, and in response to matching the simplified rolling hash value with at least one entry in the rolling hash index, generates a second hash value using a second hashing algorithm, that is a strong hash value, and determine if a match of the strong hash value exists in a first strong hash index of a primary data repository, and where the comparison module, in response to a determination that the match does not exist in the first strong hash index, further compares the strong hash value with entries in a second strong hash index in a secondary data repository; and store, in response to a determination that the strong hash value does not match an entry in the first strong hash index or the second strong hash index, the portion of the incoming stream of backup data as new data in at least one of the primary data repository or the secondary data repository.

2. The apparatus of claim 1, where the executable code causes the one or more processors to import data from the secondary data repository into the primary data repository.

3. The apparatus of claim 2, where the executable code causes the one or more processors to import the second strong hash index into the primary data repository.

4. The apparatus of claim 3, where the executable code causes the one or more processors to only import entries that correspond to the portion of the incoming stream of backup data from the second strong hash index.

5. The apparatus of claim 4, where the executable code causes the one or more processors to only import entries that are cached in the primary data repository.

6. The apparatus of claim 1, where the executable code causes the one or more processors to retrieve from the secondary data repository, in response to the determination that the strong hash value matches an entry in the second strong hash index, data corresponding to the entry in the second strong hash index.

7. The apparatus of claim 1, where the executable code causes the one or more processors to query, in response to a determination that the simplified rolling hash value does not match an entry in the rolling hash index of the primary data repository, the secondary data repository with the strong hash value to determine if the secondary data repository contains a copy of the portion of the incoming stream of backup data.

8. A method comprising:

generating, by use of a processor, a first hash value using a first hashing algorithm, that is a simplified rolling hash value, based on a portion of an incoming stream of backup data over a network;

comparing the simplified rolling hash value with entries stored in a rolling hash index, and in response to matching the simplified rolling hash value with at least one entry in the rolling hash index, generating a second hash value using a second hashing algorithm, that is a strong hash value, and determining if a match of the strong hash value exists in a first strong hash index of a primary data repository, and where the comparison module, in response to a determination that the match does not exist in the first strong hash index, further comparing the strong hash value with entries in a second strong hash index in a secondary data repository; and storing, in response to a determination that the strong hash value does not match an entry in the first strong hash index or the second strong hash index, the portion of the incoming stream of backup data as new data in at least one of the primary data repository or the secondary data repository.

9. The method of claim 8, further comprising importing data from the secondary data repository into the primary data repository.

10. The method of claim 8, further comprising importing the second strong hash index into the primary data repository.

11. The method of claim 10, further comprising importing only the entries that correspond to the portion of the incoming stream of backup data from the second strong hash index.

12. The method of claim 11, further comprising importing only entries that are cached in the primary data repository.

13. The method of claim 8, further comprising retrieving from the secondary data repository, in response to the determination that the strong hash value matches an entry in the second strong hash index, data corresponding to the entry in the second strong hash index.

14. The method of claim 8, further comprising querying, in response to a determination that the simplified rolling hash value does not match an entry in the rolling hash index of the primary data repository, the secondary data repository with the strong hash value to determine if the secondary data repository contains a copy of the portion of the incoming stream of backup data.

15. A computer program product, the computer program product comprising a non-transitory computer readable storage medium having program instructions embodied therewith, the program instructions readable/executable by a processor to cause the processor to execute steps comprising:

generating, by processor, a first hash value using a first hashing algorithm, that is a simplified rolling hash value, based on a portion of an incoming stream of backup data over a network;

comparing the simplified rolling hash value with entries stored in a rolling hash index, and in response to matching the simplified rolling hash value with at least one entry in the rolling hash index, generating a second hash value using a second hashing algorithm, that is a strong hash value, and determining if a match of the strong hash value exists in a first strong hash index of a primary data repository, and where the comparison module, in response to a determination that the match does not exist in the first strong hash index, further comparing the strong hash value with entries in a second strong hash index in a secondary data repository; and storing, in response to a determination that the strong hash value does not match an entry in the first strong hash index or the second strong hash index, the portion of the incoming stream of backup data as new data in at least one of the primary data repository or the secondary data repository.

16. The computer program product of claim 15, where the steps further comprise importing data from the secondary data repository into the primary data repository.

17. The computer program product of claim 16, where the steps further comprise importing the second strong hash index into the primary data repository.

18. The computer program product of claim 17, further comprising importing only the entries that correspond to the portion of the incoming stream of backup data from the second strong hash index.

19. The computer program product of claim 18, further comprising importing only entries that are cached in the primary data repository.

20. The computer program product of claim 15, further comprising querying, in response to a determination that the simplified rolling hash value does not match an entry in the rolling hash index of the primary data repository, the secondary data repository with the strong hash value to determine if the secondary data repository contains a copy of the portion of the incoming stream of backup data.

* * * * *